United States Patent [19]

Dassler

[11] Patent Number: 4,703,445

[45] Date of Patent: Oct. 27, 1987

[54] ATHLETIC SHOE FOR RUNNING DISCIPLINES AND A PROCESS FOR PROVIDING INFORMATION AND/OR FOR EXCHANGING INFORMATION CONCERNING MOVING SEQUENCES IN RUNNING DISCIPLINES

[75] Inventor: Armin A. Dassler, Herzogenaurach, Fed. Rep. of Germany

[73] Assignee: PUMA AG Rudolf Dassler Sport (formerly PUMA-Sportschuhfabriken Rudolf Dassler KG), Herzogenaurach, Fed. Rep. of Germany

[21] Appl. No.: 701,194

[22] Filed: Feb. 13, 1985

[30] Foreign Application Priority Data

Feb. 13, 1984 [DE] Fed. Rep. of Germany ....... 3405081

[51] Int. Cl.$^4$ ....................... G01C 22/00; G08B 23/00
[52] U.S. Cl. .................................. 364/561; 364/410; 235/105; 340/323 R
[58] Field of Search ............... 364/410, 411, 561, 562, 364/709; 235/105 R; 340/323 R; 272/69, 70, 100

[56] References Cited

U.S. PATENT DOCUMENTS

| | | | |
|---|---|---|---|
| 3,797,010 | 3/1974 | Adler et al. | 340/323 R |
| 3,974,491 | 8/1976 | Sipe | 272/70 X |
| 4,053,755 | 10/1977 | Sherrill | 364/561 |
| 4,144,568 | 3/1979 | Hiller et al. | 272/70 X |
| 4,216,956 | 8/1980 | Yamamura et al. | 272/70 |
| 4,283,712 | 8/1981 | Goody | 272/70 X |
| 4,285,041 | 8/1981 | Smith | 272/70 X |
| 4,367,473 | 1/1983 | Marin et al. | 364/561 X |
| 4,371,945 | 2/1983 | Karr et al. | 340/323 R X |
| 4,571,680 | 2/1986 | Wu | 364/561 X |
| 4,578,769 | 3/1986 | Frederick | 340/323 R X |

FOREIGN PATENT DOCUMENTS 0200119 10/1985 Japan ............................ 235/105
2121219 12/1983 United Kingdom .

Primary Examiner—Errol A. Krass
Assistant Examiner—Joseph L. Dixon
Attorney, Agent, or Firm—Sixbey, Friedman & Leedom

[57] ABSTRACT

An athletic shoe system for running disciplines and a process for emitting and/or exchanging information concerning movement factors of running disciplines enabling the athlete to always be sufficiently informed regarding his/her training program that is in progress or completed. In particular, in an area of the sole that is less stressed during use, at least one free space is provided where a transmitter is housed which, via a sensor provided in the sole, can emit at least one output signal. In accordance with preferred embodiments, a transmitter in a first shoe of a pair of shoes receives the signals from the sensor and transmits emissions in correspondence with their receipt. The transmitted emissions are received by a remote receiver, that is linked with a computer, and the remote receiver receives the transmitted emissions directly from the transmitter of the first shoe and indirectly via a receiver and transmitter of a second shoe of the pair. The computer determines the distance between the first and second shoes, on the basis of the delay between receipt by the remote receiver of the directly and indirectly received emissions, as well as other characteristic values related to stride rate or length.

28 Claims, 7 Drawing Figures

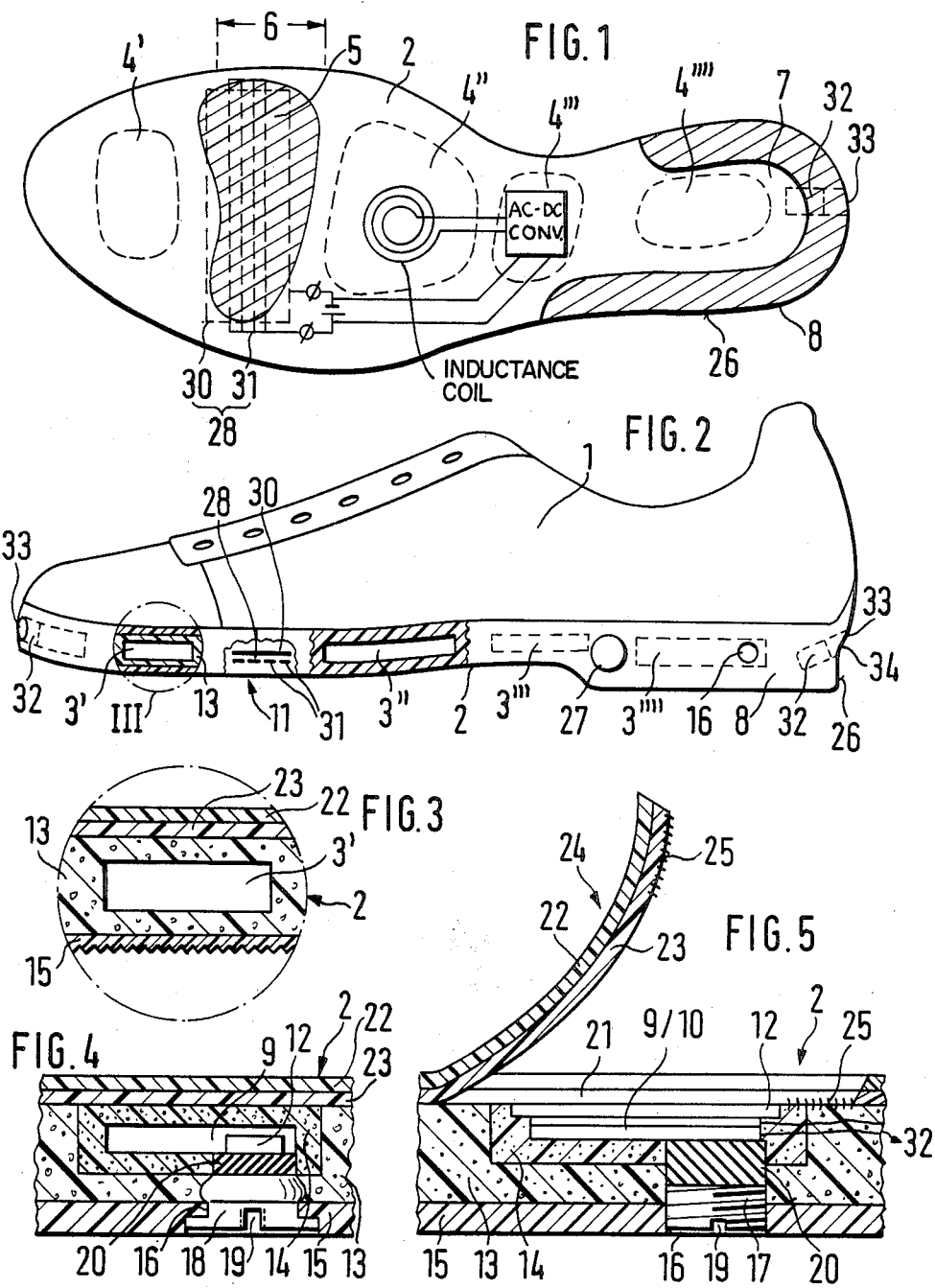

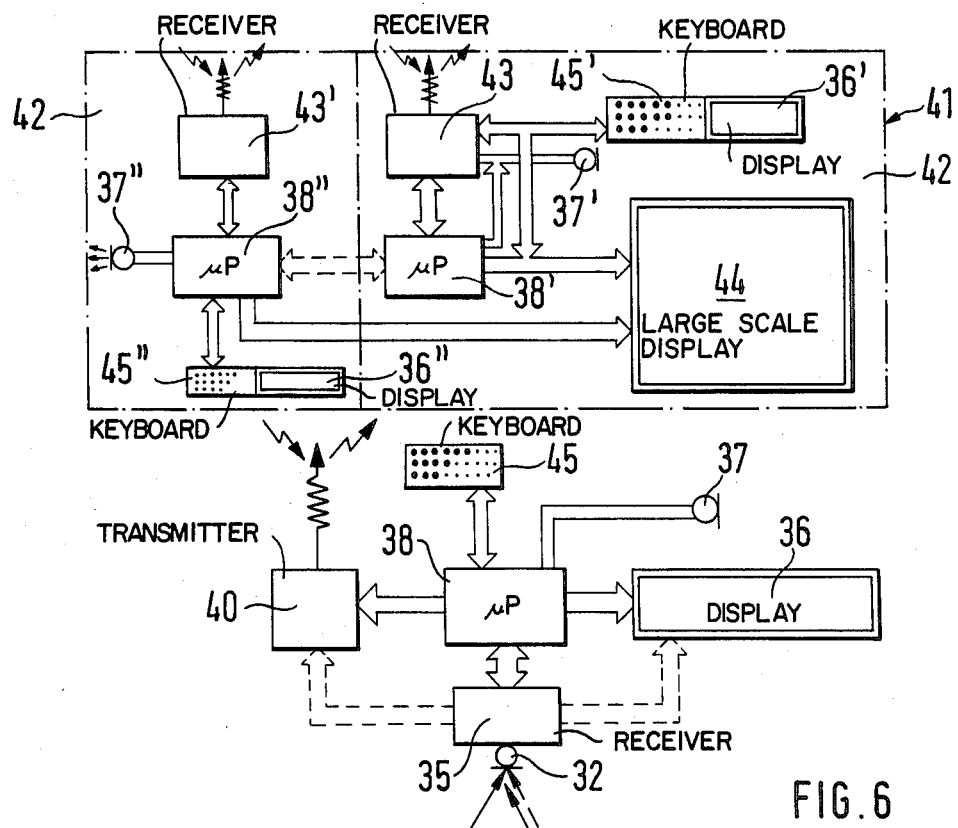
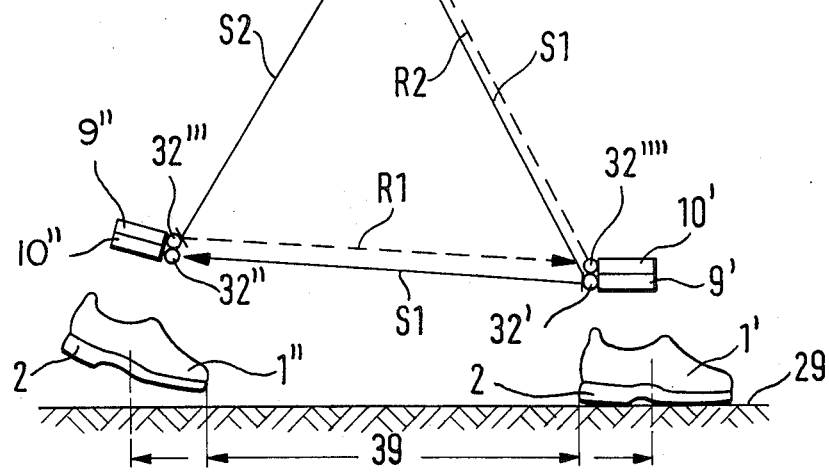
FIG.6

ATHLETIC SHOE FOR RUNNING DISCIPLINES AND A PROCESS FOR PROVIDING INFORMATION AND/OR FOR EXCHANGING INFORMATION CONCERNING MOVING SEQUENCES IN RUNNING DISCIPLINES

BACKGROUND OF THE INVENTION

This invention relates to an athletic shoe for running disciplines and a process for providing information and/or for exchanging information concerning moving sequences in running disciplines using a sensor provided in the sole of the shoe and emitting a signal in response to each step taken by the wearer and a transmitter for transmitting the signal to a remote receiver.

In sports where running long distances, medium distances or even short distances make special demands on the athlete, the athletes' training is often, to a considerable extent, aimed at the moving sequences of the limbs, especially those of the legs. For this purpose, the athlete himself or a trainer often set up certain training programs. Of special significance are, in this case, the possibilities of monitoring the training sequence and/or the achieved results. These should be recorded and compared with previous data or desired data and/or analyzed in order to recognize the training condition or the degree of training or to be able to reliably assess it in order to draw conclusions concerning further training phases or sequences and possibly also different training phases or sequences.

In published U.K. patent application No. 2,121,219 and corresponding U.S. Pat. No. 4,466,204, an electronic music pace and distance counting shoe is disclosed wherein an electronic circuit device is disposed in a shoe sole that, upon walking, jogging or running, provides a walking speed rate, music beat, beat sound, etc. Additionally, a microcomputer counts the number of steps and measures the approximate distance that the wearer has walked, jogged or run based upon a stored value that has been preset with a normal length of stride of a walker, runner or jogger. However, since stride lengths vary greatly from individual to individual, due to such factors as size and conditioning, and even with respect to a given individual over the duration of a given training session or race, due to such factors as fatigue and terrain, such a single sensor system that functions based on a preset "normal" stride length cannot provide accurate information concerning stride length and running speed, especially for various phases or sequences involving different combinations of stride length and pace. Furthermore, this known shoe is not designed to advise the wearer if his program of running-/jogging/walking is varying, at a given point in time, from a predetermined program set up for the athlete or how he must change in order to achieve the desired values. Other electronic step counting shoes are disclosed in U.S. Pat. No. 4,402,147 and International application No. PCT/GB82/00119 (International Publication No. WO82/03753) and they possess similar deficiencies.

In the skiing sport, it is known to mount a receiver and a speaker or earphone in the skier's helmet through which the athlete during training or competition can receive the instructions of the trainer. However, this information is based exclusively on the trainer's intuition and not on specific measured results and especially does not take into account the athlete's instantaneous physical condition. Such information may, therefore, also have very disadvantageous consequences for the athlete, such as overexertion or premature exhaustion. With the application of the invention, these disadvantages may be avoided completely.

SUMMARY OF THE INVENTION

It is, therefore, an object of the invention to, among other things, develop athletic shoes in such a way that the athlete is, at any time, sufficiently informed concerning the training program or competition, either instantaneously or after completion. It is a further object to provide athletic shoes which will accurately provide information concerning stride length and running speed.

It is still another object to provide athletic shoes that not only provide pace and pacing information, but provide feedback to the wearer by which the athlete can determine variance from a desired program and how to modify his actual program to achieve that desired.

In accordance with preferred embodiments of the invention, accurate information concerning an athlete's stride length, running speed and distance covered is determined by a computer by processing signals transmitted from shoe sole embedded, ground contact sensing means to remote receiving means. The information determined can be made directly available to the athlete or his trainer, or it may be compared with stored information of corresponding desired values in order to provide feedback relating to deviations occurring between actual and desired performance. In accordance with the most preferred embodiments, transmitter/receiver means are provided in both shoes of the athlete in a manner enabling the distance of both shoes to be determined, thereby eliminating the need for the use of approximations based upon contact frequency and a preset stride length.

By means of the measures according to the invention, it is possible, during running, to constantly receive information concerning at least the most important running phases or moving sequences, especially concerning the length of the steps and possibly also concerning the running speed and run distances or sections of distances. The athlete can then, in a targeted manner, use this information for changing his running or training behavior and/or program, if necessary. The received information is, therefore, provided to a device and transmitted to the athlete and/or his trainer and/or a central location. If necessary, this information is stored, at least stored temporarily, and it may also be transferred to a program or produce a program change in a computer.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 1 is a partial section of a shoe sole viewed from below, in accordance with the present invention;

FIG. 2 is a partial-sectional side view of a shoe having the sole of FIG. 1;

FIG. 3 is an enlarged representation of the circular cutout according to FIG. 2;

FIG. 4 and 5 are each a cutout of a sole or a heel; and

FIGS. 6, 6A are flow charts depicting the manner in which received information is evaluated including the means for providing the information and/or the means for transferring the program transmission.

DETAILED DESCRIPTION OF THE PREFERRED EMBODIMENTS

Figure 6A:
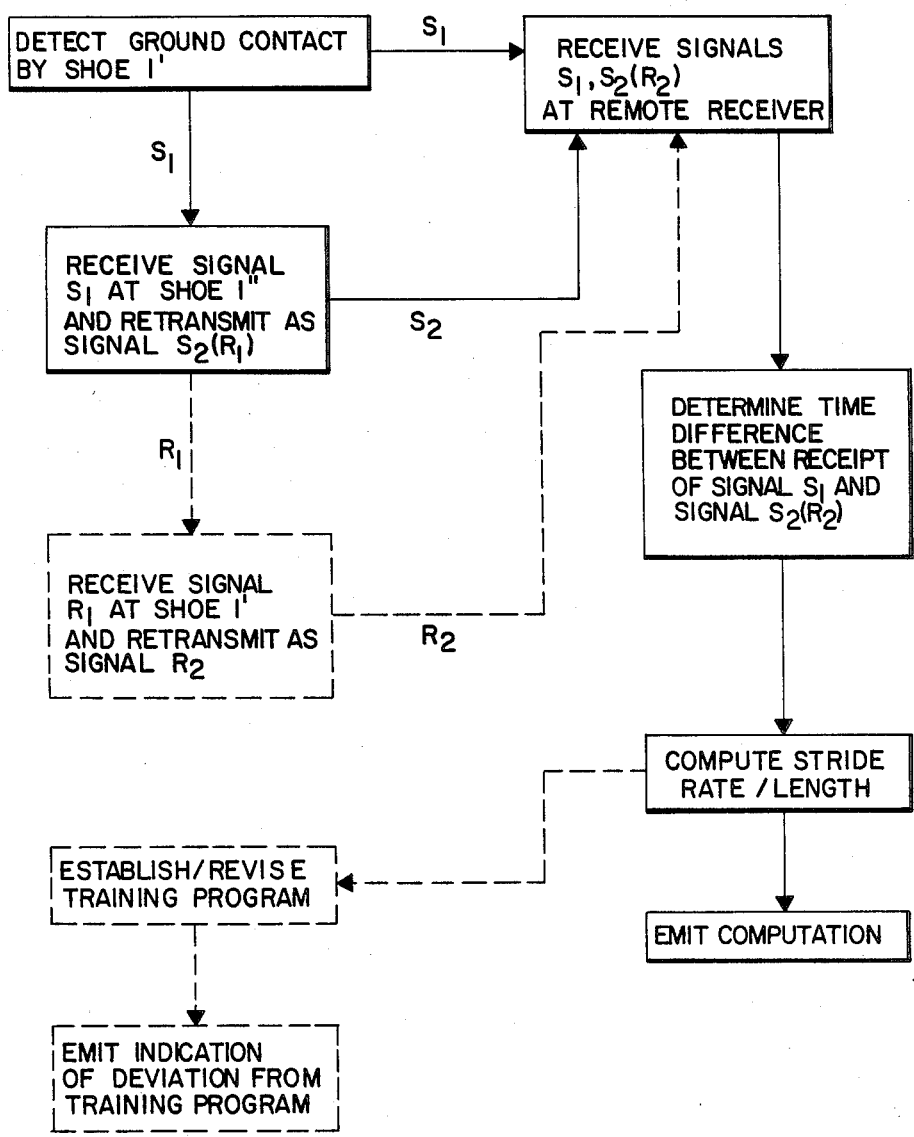

In an athletic shoe 1 for running disciplines, especially for longer distances, such as marathon distances or in the sport of jogging, but also for medium or short distances or for the starting stretch in the case of long-jumping, high-jumping, pole-vaulting, etc., at least one free space 3', 3'', 3''', 3'''' is provided in the body 2 of the sole (FIG. 2). This or these free space(s) 3', 3'', 3''', 3'''' is provided in the areas of the running sole where, normally, the lowest stress occurs during running; for example, in the center parts of the sole in area 4' in front of area 5 of the ball 6 of the foot or in area 4'' behind area 5 or in area 4''', in the joint or in front of area 8 of the heel or in area 4'''' in the center zone 7 of area 8 of the heel.

In at least one of the free spaces 3' to 3'''', a transmitter 9 and possibly also a receiver 10 and possibly at least one sensor 11 and one battery 12 are provided. The transmitter 9, the receiver 10, the sensor 11 and the battery 12 can be housed in the same or different free spaces and can be connected with one another or interact with one another. These components are housed in free spaces 3' to 3'''' in a shock-absorbing manner by being disposed in, for example, a highly elastic body 2 of the sole or in a highly elastic, specifically foamed, midsole 13 or by being surrounded by a shock-absorbing shell 14.

Components 9, 10, 11, 12 are molded into the sole 2 or the mid-sole 13, the material of the sole, preferably, being injected therearound. Alternatively, these components may be inserted subsequently, such as via an opening 16 provided in the outer sole 15. The opening 16 can be closed tightly from the outside by means of a lid. For this purpose, the lid is developed, preferably, as a screw cap 17 (FIG. 5) or as a snap cover 18 (FIG. 4), a tool recess 19 being provided by way of which cap 17 may be screwed in or out, or cover 18 may be pulled out. In particular, the opening 16 is provided for exchanging the battery 12. Any possible space between the interior side of the lid or cover and the free space 3' to 3'''' or the components 9, 10, 11, 12 or the shell 14 can be filled in by an elastic, preferably volume-compressible disk 20 that is mounted at the lid or cover 17,18.

As shown in FIG. 5, an opening 21 may also be provided in the foot bed sole 22 and/or in the insole 23. The opening 21 can be closed, for example, by a liftable upper part 24 of the sole 22/23 that is preferably held closed by a Velcro-type fastening means. The battery 12 may be a rechargeable cell, preferably a NCd-cell (nickel cadmium cell) which may be molded into the running sole or the midsole 2, 13. The charging will then take place via an outside power unit, either inductively, for example, via a coupling loop in the sole or via a tightly closeable charging socket 27 provided preferably at a side wall 26 of the sole of the shoe 1.

As the sensor 11, a pressure sensor, for example, an electric pressure responsive switch 28, such as a foil switch, a piezeo-element, a Hall element, or a similar switch, can be provided. This pressure switch, at each impact of the shoe 1 on the ground 29 during running (FIG. 6) can close and/or open, directly or indirectly, at least one contact 30, 31 and can thus, emit an output signal, for example, in the form of an electric impulse. In the case of a sufficient output, the output signal is emitted directly, or in the case of an insufficient output, after it is amplified, via the transmitter 9 and a radiating means 32, which may be an ultrasonic converter or an infrared light source, preferably an infrared light-emitting diode, or an inductance coil, in particular, an antenna coil. The transmitter 9 preferably emits an impulse of a certain length and frequency, such as for 0.01 to 0.2 sec., a frequency of 40 kHz, which is therefore in the ultrasonic range. This frequency may also be amplitude-modulated, frequency-modulated or pulse-code-modulated.

As can be seen in FIG. 2, radiating means 32 is advantageously arranged in openings 33 in the rear wall 34 of the sole, the opening 33 being closed by a suitable covering which dampens the output signals only slightly.

With reference to FIG. 6, radiating means 32 is advantageously mounted in such a way that, according to its application, it has a directional characteristic to the rear or to the front or to the side. It is in each case also arranged in such a way that it can radiate diagonally in an upward direction so that an information receiver 35 carried on the body, for example on the athlete's belt, can easily receive the emitted information.

In the simplest case, the information receiver 35 counts the received output signals and indicates them immediately or upon request at a display means 36 and/or emits the respective number of steps as a sound via a sound transmitter 37, such as a microphone or an earphone, and/or via a speech synthesizer as synthetic words. From the run distance, the athlete can then determine the average length of the steps. Vice versa, the athlete can then, after some time, when he knows the ordinary length of his steps, determine the run distance from the number of steps, which is important in the case of training runs, especially when the terrian is unknown. It is advantageous to provide a computer 38 in the information receiver 35 or a computer 38 is used that externally is carried on the athlete's body which indicates this calculation, after the length of the steps is fed in, as contacts, preferably in cycles, i.e., 1 to 4 times per second, and can thus continuously emit the run distance to the display means 45.

In the information receiver 35 or in the computer 38, a chronograph is preferably provided or integrated having, preferably a division of hundredths or thousandths so that it can determine and emit the respective instantaneous speed from the fed length of steps and from the time, when each step is measured and/or the respective overall number of steps is used for calculating the average speed. Preferably, sufficient storage capacity is provided in the computer 38 in order for it to receive the data of each step and therefore be able to determine how many steps are taken in a given time and in order to possibly also include the instantaneous overall number of steps in the instantaneous overall time. Thus, at a later time, a table or diagram can be made any time, or can be displayed or printed which supplies to the athlete an overview of the changes of the data for the distance run. After an optimization of the data by the athlete or a trainer, an individual program can be set up for the athlete. This program can be fed into a computer which will then, during a later run, compare it with the instantaneous values and as a result calculate the deviation from the desired program, and as a function of the deviations emit audible or visible instructions providing feedback to the athlete as to how the run must be changed in order to remain within the optimized values.

Instead of a pressure sensor or in addition to it, other sensors, such as acceleration sensors and/or distance sensors and/or step length sensors and/or speed sensors may be provided in the shoes 1, in which case also their signals, as output signals, are fed to the information receiver 35 and to the computer 38 which as a result calculates or establishes the mentioned or other data or carries out a program optimization.

So that the length of the steps does not have to be determined by measuring a run over a previously measured distance, according to an advantageous further development of the invention shown in FIG. 6, the step length 39 can be measured directly with a relatively small tolerance and the measured value can be indicated directly and/or can be fed to the computer 38. In the illustrated shoe 1' that is shown in FIG. 6 as being in front, relative to the running direction, a transmitter 9' and a receiver 10' are housed, and in the rear shoe 1'', a transmitter 9'' and a receiver 10'' are housed, for example, in each case an ultrasonic transmitter and receiver, with an associated radiating means 32, such as sound converters 32', 32'', 32''' and 32''''.

In this case, when the shoe 1' steps on the ground 29, the transmitter 9' emits an output signal S1 which is received by the information receiver 35 and by receiver 10'' of the rear shoe 1'' and by being applied to the transmitter 9'' is emitted by this transmitter 9'' as the output signal S2 to the information receiver 35. With the assumption that the distance of the information receiver 35 from the two shoes 1' and 1'' is about equal, the output signal S2 received by the information receiver 35 is delayed by the travelling time of the signal S1 from the front shoe 1' to the rear shoe 1''. From this, the respective step length 39 can be determined directly. Tolerances that may occur because of the fact that, for example, the sound converters 32' and 32'''' in the case of the front shoe 1' are provided in the heel and in the case of the rear shoe 1'' are provided in the tip or in a side, may be corrected by a constant correction factor which may, for example, be fed into the computer 38.

There is also the possibility to provide another receiver 10' in the front shoe 1' which receives the reflected signal R1 or the reflection signal R1 emitted by the transmitter 9'' and then directs it to the information receiver 35 as reflection signal R2. In this case, the distance 39 is passed through twice and therefore the step length is indicated twice and must then be divided in half in the computer 38 in order to receive the correct measured value. The results determined by the computer 38, such as the instantaneous step length, the instantaneous stepping speed, the instantaneous running speed, the total number of steps, the total distance, the total time, the average time, the distance that is still to be run, or the comparison with a program and the calculated correction instructions or similar quantities can be indicated at the display means 36 and/or may be emitted at the sound converter 37 as a sound of varying tone pitch and/or a sound sequence and/or as a synthetic language.

According to an advantageous further development of the invention, the data of the information carrier 35 and/or of the computer 38 can be emitted via a data transmitter 40 and can be transmitted to a receiving station 41, for example, located with the trainer or at an athletic or training center 42 or at a computer center. There these data are received by a data receiver 43 and are indicated or emitted via a display means 36 or via a large-scale display means 44 and/or converter 37' or 37'', and/or are fed to one or several additional computer(s) 38', 38'' and are calculated and displayed via this or these computer(s).

An input keyboard 45' and 45'' having display means 36' and 36'' can also be assigned to the data receiver 43 and/or to the computers 38' and 38'' in order to be able to feed and/or correct a program and/or have a program displayed.

A time-measuring means may also be integrated into the computer(s) 38, 38', 38'' or may be assigned to it or them which exchanges data with this or these computer(s) and can be used for calculating purposes.

It is advantageous to feed a training program into the computer(s) 38, 38', 38'', in which case this computer or these computers, from the data transmitted by the shoe transmitters 9, 9', 9''', determine(s) the values of the characteristic quantities contained in the program, such as length of steps, speed or similar quantities. The computer(s) also compare(s) the transmitted data with the values of these characteristic quantities stored in the program. The computer(s) may also have other functions, such as the determination of deviations, the emitting of the determined data to the athletes, the storage, printing or feeding of programs including their corrections and/or the establishing of new programs. The results of such an evaluation can then be fed back to the athlete as audible or visible instructions as to those changes that must be made to achieve optimized performance.

The receiving station 41 may also be equipped as the trainer center 42 for a large number of athletes. In this case, the signals are frequency-modulated, amplitude-modulated or pulse-code modulated in order to be able to separately receive and evaluate the data of the individual athletes. Accordingly, the receiving station 41 will then consist of a corresponding number of data carriers 43, 43', 43'', etc. and computers 38', 38'', etc. In this case, the computers 38', 38'' may also be combined to a central computer unit.

According to another advantageous development of the invention, the transmitter and the receiver in the shoes 1' and 1'' may affect one another via assigned radiating or emitting devices in such a way that, for example, according to the Doppler principle, the relative speed of both legs with respect to one another can be measured by feeding the corresponding data to the computer where they are evaluated. In this case, it is especially advantageous that, also when the shoe 1'' is lifted off the ground 29, a signal is emitted that is processed together with the signal emitted by the other shoe 1' when it steps on the ground. As a result, the measuring precision, preferably that of the measurements of the step lengths, can be increased considerably. In this regard, it is noted that, normally, a running stride produces a contact between the shoe and the ground that shifts from an initial point of impact in the heel area 8 to a terminal point of lift-off at the toe. Thus, signals indicative of initial ground contact can be produced by a sensor 12 at area 4'''' while signals indicative of lift-off can be produced by a sensor at area 4'.

Furthermore, while the preferred arrangement for providing accurate information concerning stride length and running speed is attained in the noted manners through the use of sensor, transmitter, and receiver components in both left and right shoes of a pair, it should be appreciated that suitable results can be achieved if, for example, shoe 1' has only a sensor and transmitter 9', while the shoe 1" has receiver 9" and transmitter 10", but no sensor. Likewise, by using a transmitter along with heel and toe sensors in only one shoe, it may be possible to construct the other shoe conventionally, actual stride distance and running speed being determined by the computer through modification of a preset stride and speed based upon the frequency of heel signals together with the time period between heel and toe signals, for example, it being known that the heel signal has occurred at the end of the forward step movement and the toe signal near the end of the rearward step movement and the runner's leg length being a constant.

While various embodiments in accordance with the present invention have been shown and described, it is understood that the same is not limited thereto, but is susceptible of numerous changes and modifications as known to those skilled in the art, and, therefore, it is not intended that the invention be limited to the details shown and described herein, but rather it is intended to cover all such changes and modifications as are encompassed by the scope of the appended claims.

What is claimed is:

1. An athletic shoe system for running disciplines having a sensor means provided in a sole of at least one shoe of a pair of shoes for emitting signals as a function of contact between the sole and the ground, a transmitter means in at least one of said pair of shoes for receiving said signals from the sensor means and for transmitting emissions in correspondence with the receipt of said signals, at least one receiver means for receiving the emissions from the transmitter means, and computer means linked with the receiver means for determining the length of strides taken with the pair of shoes as a function of the signals emitted by the sensor means based on the emissions received by the receiver means, wherein said sensor means comprises a ground contact responsive sensor in a first shoe of said pair of shoes, wherein said transmitter means comprises a transmitter in each of said shoes, wherein said receiver means comprises a receiver in a second shoe of said pair of shoes and a remote receiver coupled to said computer means, and wherein said computer means, via the remote receiver coupled to the computer means, receives emissions from said transmitters based upon the issuance of said signals by said sensor means and has means for determining the distance between said shoes as a function of a delay in receiving emissions directly from said transmitter in the first shoe relative to the receipt thereof via the receiver and transmitter in the second shoe.

2. An athletic shoe system according to claim 1 wherein said computer means is operative to provide feedback signals for indicating in at least one of an optical or a visual manner how the strides being taken with the pair of shoes, as detected by the sensor means, must be changed to conform with a desired program of striding.

3. An athletic shoe system according to claim 1, wherein a sole portion of at least one of the shoes is provided with at least one free space therein, at least one of said transmitting means or said receiving means being located within the at least one free space of the at least one of the shoes.

4. An athletic shoe system according to claim 3, wherein a said free space is provided in a center area of a heel of the shoe.

5. An athletic shoe system according to claim 3, wherein a said free space is provided adjacent, but outside of, a zone of the ball of the foot area of the sole.

6. An athletic shoe system according to claim 3 wherein a said free space is provided in an arch area of the sole.

7. An athletic shoe system according to claim 3, wherein said sole portion is an elastic midsole portion of the sole.

8. An athletic shoe system according to claim 3, wherein the at least one of the transmitter means and the receiver means located in the sole portion is surrounded by a shock-absorbing shell.

9. An athletic shoe system according to claim 3, wherein at least one of the transmitter means, the receiver means and a battery required for the operation thereof, are located in said sole portion, is accessible via an opening, of one of the top side and bottom side of the sole portion, that is tightly closeable by a cover.

10. An athletic shoe system according to claim 9, wherein the cover by which the opening is closeable is a snap cover.

11. An athletic shoe system according to claim 9, wherein the cover by which the open is closable is a screw cap.

12. An athletic shoe system according to claim 9, wherein the opening is provided in a foot bed sole and an insole, and the cover is formed by parts thereof that are at least partially removable from the opening by one of being bent away and ripped out.

13. An athletic shoe system according to claim 12, wherein a "Velcro"-type fastening means is provided for securing the cover parts in position closing the opening.

14. An athletic shoe system according to claim 9, wherein an elastic disk is mounted on the inner side of the cover.

15. An athletic shoe system according to claim 3, wherein in an area of the sole, a tightly closable charging connection is provided for charging of a battery provided in the sole for operating the at least one of the transmitter means and the receiver means located in said sole portion.

16. An athletic shoe system according to claim 15, wherein the battery is molded into the sole and wherein an inductance coil and an alternating-current/direct-current converter for charging of the battery from an external alternating-current source is provided in the sole.

17. An athletic shoe system according to claim 1, wherein the sensor means comprises pressure sensor.

18. An athletic shoe system according to claim 1, wherein a lateral wall of the sole of said at least one shoe has at least one lateral opening through which said emissions, in the form of at least one of electromagnetic and optic rays, are passable.

19. An athletic shoe system according to claim 1, wherein a time-measuring means is associated with the computer means in a data exchangeable manner enabling the time-measuring means to be used for calculating purposes.

20. An athletic shoe system according to claim 1, wherein means are provided for enabling the computer means to determine at least one of a distance traveled with the shoes, a speed at which the wearer is traveling with the shoes or the stride length from the information signals received from the relative movement of both shoes with respect to each other.

21. An athletic shoe system according to claim 20, wherein the sensor means and the transmitter means are associated with said first shoe of the pair of shoes to emit a signal each time the shoe contacts the ground and are associated with said second shoe of the pair of shoes for emitting a signal each time said second shoe lifts off the ground.

22. An athletic shoe system according to claim 1, wherein the receiver means also includes a receiver in said first shoe for receiving a reflected signal from the second shoe, said reflected signal being directed by the transmitter of the first shoe to said remote receiver for use by the said means for determining.

23. An athletic shoe system according to claim 1, wherein the computer means is provided with data storage means.

24. A process for determining information concerning movement factors in running disciplines using a pair of shoes comprising the steps of outputting a first signal when a first of said shoes contacts the ground, from a transmitter of said first shoe, in such a way that it can be received by a first receiver provided at a location displaced from said pair of shoes as well as by a second receiver of a second shoe of said pair of shoes; receiving of the output signal by the second receiver in said second shoe and causing a transmitter located in the said second shoe to output a second signal in such a way that it can be received by the first receiver; determining from the time difference between receipt of the two output signals by the first receiver, at least one of the stride rate or stride length taken with the shoes via a computer linked with the first receiver; and emitting the result of the computer determination by at least one of an optical display means or an acoustic converter means.

25. A process according to claim 24, wherein the computer sets up a training program from data determined during the process using previously stored data.

26. A process according to claim 25, wherein a training program is fed into the computer, said computer determines values of characteristics quantities contained in the program from the data transmitted by the shoe transmitters and compares the determined characteristic quantities with characteristic quantities stored in the program, determines the existence of deviations between the determined and stored characteristic quantities, and provides at least one of an indication of the deviation, a correction to the stored program, or establishment of a new program.

27. A process according to claim 24, wherein the second signal is received by the first receiver directly from the transmitter of said second shoe.

28. A process according to claim 24, wherein the second signal is received by the first receiver indirectly from the transmitter of said second shoe via a receiver of said first shoe and the transmitter of said first shoe.

* * * * *